United States Patent [19]
Bowen et al.

[11] Patent Number: 5,985,997
[45] Date of Patent: Nov. 16, 1999

[54] IN SITU PROCESS FOR MAKING A BIMODAL HIPS HAVING BOTH HIGH GLOSS AND HIGH IMPACT STRENGTH

[75] Inventors: Kenneth E. Bowen, Belpre; Michael J. Hanner, Marietta, both of Ohio

[73] Assignee: Chevron Chemical Company, San Ramon, Calif.

[21] Appl. No.: 08/862,223

[22] Filed: May 23, 1997

[51] Int. Cl.⁶ .................................................. C08G 63/48
[52] U.S. Cl. ........................... 525/71; 525/243; 525/316; 525/332.9; 525/333.3
[58] Field of Search ............................ 525/71, 86, 243; 515/316, 332.9, 333.3

[56] References Cited

U.S. PATENT DOCUMENTS

| | | |
|---|---|---|
| 4,146,589 | 3/1979 | Dupre . |
| 4,282,334 | 8/1981 | Walter . |
| 4,334,039 | 6/1982 | Dupre ....................................... 525/263 |
| 4,493,922 | 1/1985 | Echte . |
| 4,777,210 | 10/1988 | Sosa et al. ................................. 525/53 |
| 5,039,714 | 8/1991 | Kasahara . |
| 5,294,656 | 3/1994 | Okamoto . |
| 5,334,658 | 8/1994 | Blumenstein . |
| 5,428,106 | 6/1995 | Schrader . |
| 5,491,195 | 2/1996 | Schrader . |
| 5,756,579 | 5/1998 | Fornasari et al. .......................... 525/99 |

*Primary Examiner*—Robert Dawson
*Assistant Examiner*—D. Aylward
*Attorney, Agent, or Firm*—Thomas G. De Jonghe; David M. Tuck

[57] ABSTRACT

A continuous bulk polymerization process for making a high gloss, high impact strength polystyrene based resin having a bimodal particle size distribution containing capsule particles having an average size of 0.2 to 0.6 microns and cellular particles having an average particle size of 1.2 to 8.0 microns. The process comprises three reaction zones in series where styrene and a styrene-butadiene copolymer are fed to the first reaction zone which is maintained at pre-phase inversion conditions and no particles are allowed to form. The capsule particles form in the second reaction zone which is maintained at post-phase inversion conditions. Polybutadiene is introduced into the third reaction zone which is also maintained at post-phase inversion conditions. The cellular morphology particles form in the third reaction zone. The resultant bimodal particle size polymer mixture may be subjected to devolitilization after the third reaction zone or, alternatively, the mixture can be subjected to further polymerization in one or more finishing reactors prior to polymerization.

20 Claims, No Drawings

IN SITU PROCESS FOR MAKING A BIMODAL HIPS HAVING BOTH HIGH GLOSS AND HIGH IMPACT STRENGTH

FIELD OF THE INVENTION

The present invention relates to a process of making a high gloss, high impact strength polystyrene resin in a continuous in situ process, and to such compositions.

BACKGROUND OF THE INVENTION

Homopolymer polystyrene resin is typically a rather brittle resin having a poor impact strength. It has long been known that impact strength of polystyrene can be greatly improved by the addition of rubbery particles dispersed throughout the polystyrene resin. Polystyrene resins of improved strength achieved by addition of rubbery particles is often referred to as high impact strength polystyrene (HIPS). The size of the rubbery particles and the concentration of rubber particles dispersed within the HIPS resin are believed to affect the impact strength of the HIPS resin.

The addition of the rubbery particles to PS to form HIPS tends to result in a reduction of the glossiness of the resin and the products made from the resin. The lack of gloss of conventional HIPS resins is often a disadvantage relative to materials such as acrylonitrile-butadiene-styrene (ABS) resin, as ABS generally has both high impact strength and high gloss. Many consumer products require a balance of both gloss and impact strength. Examples of such products include telephones, computers, and other consumer electronics.

Other requirements besides strength and gloss for these products is low cost and availability in large volumes. In particular, cost of the resin must be competitive with alternatives (such as ABS). Also, the resin must be available in large commercial volumes thus a large scale manufacturing process must be viable.

Gloss of conventional HIPS resins has been improved by using relatively small size rubber or elastomer particles, as opposed to large size particles. Further, it has been found that resins that have both small elastomer particles and large elastomer particles, in a bimodal size distribution, have both good gloss and high impact strength. See, for example, U.S. Pat. Nos. 4,282,334; 4,493,922 and 5,039,714. U.S. Pat. No. 5,294,656 also discloses a bimodal resin composition. The '656 resin comprises a styrene matrix containing small-sized particles having a core/shell structure with an average particle size of 0.1 to 0.4 microns, and large-sized particles having a cell structure with an average particle size of 0.8 to 2.0 microns.

U.S. Pat. No. 5,334,658 to Blumenstein et al. discloses a bimodal HIPS resin composition comprising 75 to 97% by weight polystyrene and 3 to 25% of a particulate elastomeric (co)polymer. 40 to 98% by weight of the particulate elastomeric (co)polymer in the form of capsule particles having a mean particle size of from 0.1 to 0.6 microns; and 1 to 60% of the remaining (co)polymer having a particle size of from 0.200 to 1.200 microns and having cell morphology; and from 40 to 99% by weight of the remaining (co)polymer having a mean particle size of from 1.2 to 8.0 microns also having cell morphology. The composition in Blumenstein et al. was made by mixing melts in an extruder.

U.S. Pat. No. 5,428,106 to Schrader et al. discloses a HIPS composition comprising 90 to about 55 wt. % polystyrene and 10 to about 45 wt. % grafted and occluded diene-based rubber particles. The rubber particles are composed of:

25 to about 80 weight percent having a capsule morphology and a volume average size of from 0.1 to 0.4 microns; and from about 75 to about 20 weight percent of rubber particles having an entanglement morphology and having a volume average particle size of from about 0.25 to 1 micron.

The examples of this patent disclose making the claimed resin in a continuous, linear three stirred tube reactor system.

U.S. Pat. No. 5,491,195 also to Schrader et al. is a division of the same parent application as U.S. Patent 5,428,106 discussed above. '195 discloses a method of making the resin claimed in the '106 patent. '195 discloses the use of three stirred tube polymerization reactors connected in a series. '195 also discloses a composition comprising 90 to 55 weight percent polystyrene and 10 to about 45 weight percent diene-based rubber particles dispersed within the polystyrene matrix. The rubber particles are composed of:

25 to about 80 weight percent of rubber particles having a capsule morphology and a volume average particle size of from 0.1 to 0.4 microns;

75 to about 20 weight percent entanglement particles; and 1 to 25 weight percent of rubber particles having a cellular morphology and a volume average particle size of from about 0.6 to about 1.2 microns.

Blumenstein et al. U.S. Pat. No. 5,334,658 does not disclose an in situ process to make bimodal HIPS.

Schrader et al. U.S. Pat. No. 5,428,106 discloses an in situ process to make a high gloss, high impact styrene resin but neither Schrader et al. U.S. Pat. No. 5,428,106 nor U.S. Pat. No. 5,491,195 disclose using such process to make a bimodal resin. The compositions of the resins disclosed in the Schrader et al. patents both comprise large amounts (75 to about 20 weight percent) of entanglement type particles. Schrader et al. '195 also discloses the presence of cellular type particles in the composition but the cellular particles are of a volume average particle size of from about 0.6 to about 1.2 microns.

U.S. Pat. No. 4,146,589 to Dupre discloses a method for making a bimodal HIPS in a mass polymerization process. Dupre forms a first partially polymerized solution containing rubber particles having an average diameter of about 0.5 to 1.0 microns in a first reaction zone. A second partially polymerized solution containing rubber particles having an average diameter of about 2 to 3 microns is formed in parallel in a second reaction zone. The first and second partially polymerized solutions are mixed together in a third reaction zone. The Dupre method requires two reactor trains in parallel where the rubber particles are formed prior to combining the two streams. The parallel reactor method of Dupre requires at least one additional reaction step than the process of the present invention.

SUMMARY OF THE INVENTION

According to the present invention, a process is provided to make high impact strength polystyrene HIPS resin having both an exceptionally high gloss and a high impact strength. The present invention provides an "in situ" process, allowing the production of high gloss, high impact HIPS resin without separate steps for making two resins having different rubber particle sizes and then blending the two different particle size resins. Also, the present invention may be readily carried out on a large continuous scale. Using the conditions of the present invention, we have found that a bimodal distribution of elastomer particles of particular size range and morphology type is achieved and that both high gloss and high impact strength are also achieved for the resulting resin.

The process of the present invention produces a resin suitable for forming high impact, high gloss product, said resin containing capsule particles of 0.2 to 0.6 microns and cellular particles of 1.2 to 8.0 microns. The process of the present invention comprises:

a. Contacting a first styrene monomer feed and a styrene-butadiene copolymer feed in a first reaction zone under polymerization reaction conditions to form a first mixture;

b. Controlling the reaction conditions in the first reaction zone so there is no phase inversion and no formation of capsule particles;

c. Reacting the first mixture in a second reaction zone to form a substantial amount of the capsule particles and form a second mixture; and d. Contacting the second mixture in a third reaction zone with a polybutadiene under reaction conditions to form a substantial amount of the cellular particles.

An advantage of the present invention is that it can use Continuous Stirred Tank Reactors (CSTR), Stirred Tower Reactors, Axially Segregated Horizontal Reactors, and Pipe Reactors with Static Mixers which are readily available in many bulk process polystyrene production facilities. Particularly preferred reactors of the process of the present invention are CSTR reactors.

Still a further advantage of the process of the present invention is that it uses a minimum number of steps and thus minimizes the number of reactors and major equipment needed to make a bimodal HIPS resin having excellent gloss and impact strength. The process of the present invention can be carried out using, very little new equipment to make the high gloss, high impact strength HIPS resin.

We have found that to achieve the good gloss to impact strength balance of the resin of the present invention the amount of polybutadiene fed to the third reaction zone is preferably 3% to 30% by weight, more preferably 5% to 20% by weight of the styrene-butadiene copolymer fed to the first reaction zone.

The advantages of the present invention described above allow a high impact strength, high gloss HIPS resin to be produced much more economically than by previous processes. This lower cost of production allows the bimodal HIPS resin to be cost competitive with other high gloss, high impact resins.

Among other factors, the present invention is based on our finding that a high gloss, high impact strength HIPS resin containing primarily 0.2 to 0.6 micron capsule particles and 1.2 to 8.0 micron cell particles can be made in a continuous, in situ process.

We have found that the resin of the present invention when used in conjunction with a plasticizer produces a resin having particularly good impact properties. Particularly preferred plasticizers useful in the present invention are mineral oil and polybutenes.

We have found that a particularly advantageous resin is achieved by the process of the present invention when the volume of capsule particles is preferably 50% to 90% of the total volume of the elastomer particles and the amount by volume of the cellular particles in the resin of the present invention is preferably 5% to 30%, and more preferably 5% to 20% of the total volume of particles in the resin. According to a more preferred embodiment of the present invention the amount of capsule particles is preferably 75% to 90% of the total volume of elastomer particles and the amount of cell particles is preferably 5% to 15% of the total volume of elastomer particles in the resin. The amount of entanglement type particles in the resin of the present invention is less than 20% of the total volume of the elastomer particles, preferably less than 15%, more preferably less than 10%, still more preferably less than 5%, and most preferably less than 2%. We have also found that the total amount of elastomer in the resin of the present invention is preferably 5 to 20% by weight, more preferably 10 to 15% by weight, and most preferably 12 to 14% by weight.

DETAILED DESCRIPTION OF THE INVENTION

The process of the present invention provides a continuous in situ polymerization of styrene and elastomer particle forming materials to form a bimodal HIPS composition having high impact strength and high gloss.

The elastomer forming materials preferred for use in the present invention especially in the first reaction zone include styrene-diene copolymers such as styrene-butadiene copolymers. The styrene and diene can be polymerized to form a random copolymer. The styrene-diene copolymer can also be a so-called "styrene block copolymer". A styrene block copolymer (or styrene-diene block copolymer) is one where the polystyrene and the polydiene are present in the form of blocks or segments that are substantially composed of homopolymer. The homopolymer segments are connected together chemically to form a single polymer chain having two or more homopolymer segments. Between the homopolymer segments may be a region that is not homopolymer but consists of both copolymers in a substantially random configuration. This region is called "taper". Preferably in the process of the present invention a styrene-butadiene diblock copolymer is used as a feed to the first reaction zone.

Another form of elastomer that we have found useful in the present invention especially as a feed to the third reaction zone is simply a diene based rubber such as polybutadiene. The polystyrene may be grafted to polydiene rubber to some extent prior to use or can be used simply in its homopolymer form. A preferred form of rubber useful in the present invention is polybutadiene which is predominantly in the cis configuration. Other polydiene rubbers that may be useful in the present invention include polyisoprene.

A preferred process of the present invention is a continuous bulk polymerization process which includes three reaction zones in series where the degree of polymerization increases from the first reactor to the third reactor. The reactors suitable for this process include many reactor designs that are typically in use in polystyrene bulk polymerization processes. Examples of suitable reactors include Continuous Stirred Tank Reactors (CSTR), Stirred Tower Reactors, Axially Segregated Horizontal Reactors, and Pipe Reactors with Static Mixers. Important features of the reactors suitable for the process of the present invention include a temperature control element, a mixing element, and the ability to control the residence time in a given reactor.

The preferred type of reactor for the process of the present invention is the CSTR. The CSTR is advantageous because it allows for precise independent control of the residence time in a given reactor by adjusting the level in a given reactor. Thus, the residence time of the polymer mixtures can be independently adjusted and optimized in each of the reactors in series.

In the preferred process of the present invention, styrene monomer and an elastomer material, preferably styrene-butadiene copolymer, are fed to a first reaction zone. Polymerization is initiated either thermally or chemically. Many chemical initiators are available that are useful in the present invention. Examples of initiators we have found useful in the present invention include tert-butyl peroxybenzoate and tert-butyl peracetate. The conditions are maintained to prevent phase inversion or formation of discrete rubber particles in the first reaction zone. The degree of polymerization (the amount of monomer converted to polymer) in the first reaction zone is 3% to 25%, preferably 5% to 20%, more preferably 5% to 15%, most preferably 5% to 12%. An important function of the first reaction zone is to provide an opportunity for grafting of the styrene monomer to the elastomer.

Optionally, a chain transfer agent may also be added to the first reaction zone (or, alternatively, to later reaction zones) to facilitate free radical transfer. Many chain transfer agents are well known in the art. Preferred chain transfer agents useful in the present invention are ethylbenzene, alpha methyl styrene and dodecylmercaptan. We have found a particularly preferred chain transfer agent useful in the present invention is 4-(1-methyl-1-ethylidene)-1-methyl-1-cyclohexene commonly known as terpinolene. Appropriate addition of chain transfer agent can help to control the size of the capsule particles formed in the next step.

Preferably, the styrene-butadiene copolymer fed to the first reaction zone has a styrene content of by weight 25% to 50%, more preferably 25% to 40%, and still more preferably 30% to 40%. The styrene-butadiene copolymer is preferably a styrene-butadiene block copolymer and more preferably a styrene-butadiene diblock copolymer. A styrene-butadiene diblock copolymer consists essentially of a block of polystyrene chemically grafted to a block of polybutadiene to form a polymer chain having predominantly two blocks.

The effluent from the first reaction zone is allowed to flow into a second reaction zone. The second reaction zone is maintained beyond phase inversion. In the second reaction zone, capsule particles are formed having an average size of 0.2 to 0.6 microns. A substantial amount of the capsule particles are formed in the second reaction zone. At least 90%, preferably at least 95%, more preferably at least 98%, and most preferably at least 99% of the capsule particles formed in the process of the present invention are formed in the second reaction zone. The particle size of the capsule particles is controlled by adjusting the temperature, stirring rate, and residence time in the second reaction zone. The degree of polymerization in the second reaction zone is 20% to 55%, preferably 25% to 50%, and more preferably 30% to 40%.

The effluent from the second reaction zone is allowed to flow into a third reaction zone. A second feed stream is also fed into the third reaction zone. The second feed stream provides a second source of elastomer. The second feed stream is preferably a diene based rubber in styrene monomer. More preferably, the second feed stream contains a polybutadiene rubber. Most preferably, the second stream contains a polybutadiene rubber predominantly in the cis configuration (also known as Hi Cis polybutadiene). A substantial amount of the cellular particles formed in the process of the present invention are formed in the third reaction zone. At least 85%, preferably at least 90%, more preferably at least 95%, and most preferably at least 98% of the cell particles formed in the process of the present invention are formed in the third reaction zone. The conditions in the third reaction zone are controlled such that rubber particles formed are predominantly of the cell morphology and have an average particle size of 1.2 to 8.0 microns. The degree of polymerization in the third reaction zone is 40% to 85%, preferably 50% to 80%, more preferably 55% to 70%.

We have found that the rate of addition of the polybutadiene to the third reaction zone relative to the rate of addition of the styrene-butadiene copolymer to the first reaction zone has a significant impact on the gloss and impact balance of the resultant resin. The addition rate of the polybutadiene should be 1% to 30% by weight, preferably 3% to 30% by weight, and more preferably 5% to 20% by weight of the addition rate of the styrene-butadiene copolymer. Too high a ratio of polybutadiene/SB copolymer will cause low gloss in the resultant resin or even a reduction of impact strength at very high ratios. If the ratio is too low, the impact strength of the resin is reduced due to a lack of cellular particles.

The effluent from the third reaction zone may be devolatilized by conventional means to remove unreacted styrene monomer.

In an alternate preferred embodiment of the present invention, the effluent from the third reaction zone is allowed to flow to one or more finishing reactors prior to devolatilization. The finishing reactor is operated to allow the polymerization to proceed to nearer completion. The degree of polymerization in the alternative embodiment finishing reactor is 70% to 90%, preferably 75% to 85%.

Still a further alternative is to have at least two finishing reactors. The degree of polymerization in the last of at least two finishing reactors is 75% to 90%, more preferably 82% to 90%.

Another preferred embodiment of the present invention is the use of a plasticizer. The use of the plasticizer in the process of the present invention helps to improve the impact strength of the resultant polymer. The plasticizer may be added at any point in the process so as to ensure that it is mixed well with the polymer. Preferred plasticizers for the present invention include mineral oil, polybutenes, or a combination of both mineral oil and polybutenes. The amount of plasticizer useful in the present invention on a total weight basis of the polymer produced is less than 10%, preferably 1% to 8%, more preferably 1% to 5%, and most preferably 2% to 4%.

In this invention, average particle size is determined using Transmission Electron Microscopy (TEM). TEM has been found to be a more consistent and accurate process for determining particle size in these resins in part because other analytical techniques, such as laser light scattering, employ the use of solvents. It has been found that the solvent can cause swelling of the rubber particles or even dissolve the styrene block copolymer causing inaccuracies in the measurements. The average particle sizes are determined using transmission electron micrographs of ultra-thin slices of the materials. The average size for the particle types are measured separately. Therefore, the cell particles and the single occlusion particles are all treated independently. These particle types have distinctively different appearances which are recognizable in the TEM image.

Particle size measurements referred to in this application are average particle sizes as determined by the measurement method outlined below. Particle volumes as discussed in this application are determined using methods well known in the art such as the one given below. The alternate measurement method also referred to below was not used for the measurements given in this invention but is effectively equivalent for spherical particles.

Particle size measurement is accomplished by (1) overlaying a transparency containing straight lines on a TEM photograph of the resin, (2) measuring the total length of the line segments contained inside particles of a given type, and (3) counting the number of particles intersected. This process is repeated for as many lines as is necessary to give a reasonably good statistical average. The following formula is then used to calculate average particle size:

$$\text{Average Particle Size} = \frac{\text{total length of segments bisected}}{\text{number of particles intersected}}$$

This method gives an average particle size even for particles that are not spherical.

An alternate method to determine an average particle diameter is similar to the above but assumes the particles are spherical. It involves measuring the particle size distribution of 500 particles of a given particle type from the transmission electron micrograph(s) of an ultra-thin specimen. A histogram of the sizes is developed, then the following formula is used to compute the mean particle diameter:

$$\text{Mean particle diameter} = \frac{S n_i D_i^2}{S n_i D_i}$$

where $n_i$ is the number of the soft particles having size $D_i$.

A reference for these measurement methods is *Quantitative Microscopy* by R. T. Dehoff and F. N. Rhines, Techbooks, 1968.

Additional parameters that characterize the material are the percentage volume (or volume fraction) of elastomer in the form of Cell Particles ($V_{cell}$) and the percentage volume of elastomer in the form of Capsules ($V_{cap}$). These values are most conveniently measured via image analysis of the TEM images using the stereology principle of volume fraction=area fraction=line fraction=point fraction. Thus, the volume fractions of the Cells ($V_{Cell,T}$) and of the Capsules ($V_{Cap,T}$) in the sample can be obtained individually. The details of the methods to obtain these quantities ($V_{Cell,T}$ and $V_{Cap,T}$) from TEM images were described in standard stereology textbooks, e.g., DeHoff and Rhines. Here, $V_{Cell,T} = V'_{Cell}/V_T$, and $V_{Cap,T} = V'_{Cap}/V_T$; where
  $V'_{Cell}$ is the actual volume of the Cell particles in the sample,
  $V'_{Cap}$ is the actual volume of the Capsules in the sample, and
  $V_T$ is the total volume of the sample.

The volume ratio (R) of Cells to Capsules is then $V_{Cell,T}/V_{Cap,T}$, which is the same as $V'_{Cell}/V'_{Cap}$. Hence, $R = V_{Cell,T}/V_{Cap,T} = V'_{Cell}/V'_{Cap}$ Since virtually all the elastomer was used up in making the Cell and Capsule particles, the total volume of elastomer is $V'_{Cell} + V'_{Cap}$. The volume fraction elastomer in the form of Cell particles is thus:

$V_{Cell} = V'_{Cell}/(V'_{Cell} + V'_{Cap}) = R/(1+R)$

Correspondingly, the volume fraction elastomer in the form of Capsule particles is:

$V_{Cap} = V'_{Cap}/(V'_{Cell} + V'_{Cap}) = 1/(1+R)$

EXAMPLES

Example 1

A solution containing 11.7 weight % of a 40/60 styrene-butadiene copolymer dissolved in styrene monomer was fed continuously to a stirred tank reactor. The flow into and out of the reactor was equal, and the level was maintained such that the average residence time was 1.5 hours. A chain transfer agent, was added to the feed to the first CSTR. The reactor temperature was maintained at 120° C. The resulting effluent solution from the first CSTR, not yet phase inverted, was fed continuously to a second CSTR to undergo phase inversion at a temperature of 133° C. and an average residence time of 1.5 hours. The effluent from the second CSTR was then fed to a third CSTR, operated at 140° C., with an average residence time of 1.3 hours. To this third CSTR was added another feed stream comprised of polybutadiene rubber dissolved into styrene monomer at 15 weight %. The rate of addition was such that the polybutadiene feed added in the third CSTR was 24% of the polybutadiene added in the first CSTR. The polymerization was continued in a fourth CSTR up to 85–90%. Mineral oil was added in the fourth CSTR at an amount to give 3.5 weight % in the final HIPS. Residual monomer was removed by using conventional means.

The properties of the resulting HIPS resin are shown in Table 1.

Example 2

Example 1 was repeated, but the addition rate of the second feed stream, added to the third CSTR, was increased such that the polybutadiene added in the third reactor was 48% of the polybutadiene added in the first CSTR.

The properties of the resulting HIPS resin are shown in Table 1.

TABLE 1

| Properties | | Example 1 | Example 2 |
| --- | --- | --- | --- |
| Polybutadiene | (wt. %) | 8.7 | 10.0 |
| Mineral Oil | (wt. %) | 3.5 | 3.5 |
| Melt Flow | g/10 min | 4.3 | 3.9 |
| Izod | ft-lb/in | 2.0 | 2.4 |
| Gloss | % | 101 | 99 |
| Reflective Haze | % | 56 | 76 |
| Average Particle Size | | | |
| Capsule Particles | microns | 0.4 | 0.4 |
| Cell Particles | microns | 1.5 | 1.9 |

What is claimed is:

1. A process of making a resin suitable for forming high impact, high gloss product, said resin containing capsule particles of 0.2 to 0.6 microns and cellular particles of 1.2 to 8.0 microns, said process comprises:
   a. Contacting a first styrene monomer feed and a styrene-butadiene copolymer feed in a first reaction zone under polymerization reaction conditions to form a first mixture;
   b. Controlling the reaction conditions in the first reaction zone so there is no phase inversion and no formation of capsule particles;
   c. Reacting the first mixture in a second reaction zone to form a substantial amount of the capsule particles and form a second mixture; and
   d. Contacting the second mixture in a third reaction zone with a polybutadiene under reaction conditions to form a substantial amount of the cellular particles.

2. The process of claim 1 wherein the polybutadiene is fed to the third reaction zone at 1% to 30% by weight of the rate at which the styrene-butadiene copolymer is fed to the first reaction zone.

3. The process of claim 1 wherein said first, second and third reaction zones comprise continuous stirred tank reactors.

4. The process of claim 1 wherein the cellular particles comprise 5 to 30 volume % of the total particle volume in the resin.

5. The process of claim 1 wherein the capsule particles comprise 50 to 90 volume % of the total particle volume in the resin.

6. The process of claim 1 wherein the resin contains on a total weight basis 80 to 90% polystyrene.

7. The process of claim 1 wherein the effluent from the third reaction zone is fed to a fourth reaction zone under polymerization conditions.

8. The process of claim 7 wherein the effluent from the fourth reaction zone is fed to a fifth reaction zone under polymerization conditions.

9. The process of claim 7 wherein the effluent from the fourth reaction zone contains less than 25% by weight unreacted styrene monomer.

10. The process of claim 8 wherein the effluent from the fifth reaction zone contains less than 20% by weight unreacted styrene monomer.

11. The process of claim 6 wherein the resin contains on a total weight basis 1% to 5% polybutenes.

12. The process of claim 6 wherein the resin contains on a total weight basis 1% to 5% mineral oil.

13. The process of claim 1 wherein the styrene-butadiene copolymer is a styrene-butadiene block copolymer.

14. The process of claim 13 wherein the styrene-butadiene copolymer is a styrene-butadiene diblock copolymer.

15. The process of claim 4 wherein the resin further comprises less than 20 volume % entanglement particles.

16. The process of claim 4 wherein the resin further comprises less than 5 volume % entanglement particles.

17. A resin suitable for forming high impact, high gloss product, said resin containing capsule particles of 0.2 to 0.6 microns and cellular particles of 1.2 to 8.0 microns, wherein said resin is produced by the steps comprising:
   a. Contacting a first styrene monomer feed and a styrene-butadiene copolymer feed in a first reaction zone under polymerization reaction conditions to form a first mixture;
   b. Controlling the reaction conditions in the first reaction zone so there is no phase inversion and no formation of capsule particles;
   C. Reacting the first mixture in a second reaction zone to form a substantial amount of the capsule particles and form a second mixture; and
   d. Contacting the second mixture in a third reaction zone with a polybutadiene under reaction conditions to form a substantial amount of the cellular particles.

18. The resin of claim 17 wherein the cellular particles make up 5 to 30% of the total volume of particles.

19. The resin of claim 18 wherein the resin further comprises less than 15 volume % entanglement particles.

20. The process of claim 1 wherein the polybutadiene is fed to the third reaction zone at 5% to 20% by weight of the rate at which the styrene-butadiene copolymer is fed to the first reaction zone.

* * * * *